(12) United States Patent
Hart et al.

(10) Patent No.: US 9,574,586 B2
(45) Date of Patent: Feb. 21, 2017

(54) SYSTEM AND METHOD FOR AN ELECTROSTATIC BYPASS

(71) Applicant: The Boeing Company, Chicago, IL (US)

(72) Inventors: Colin W. Hart, Everett, WA (US); Marcus K. Richardson, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 31 days.

(21) Appl. No.: 14/697,570

(22) Filed: Apr. 27, 2015

(65) Prior Publication Data

US 2016/0312809 A1    Oct. 27, 2016

(51) Int. Cl.
*F15C 1/04* (2006.01)
*F15D 1/00* (2006.01)

(52) U.S. Cl.
CPC .................................. *F15D 1/0075* (2013.01)

(58) Field of Classification Search
CPC ............. F15D 1/0075; Y10T 137/0391; Y10T 137/2191; Y10T 137/6525; Y10T 137/6579
USPC .............. 137/827, 13, 340, 338, 909; 95/61; 165/283, 303, 54, 55, 56, 110
See application file for complete search history.

(56) References Cited

U.S. PATENT DOCUMENTS

| | | | | | |
|---|---|---|---|---|---|
| 2,343,338 | A | * | 3/1944 | Steel | F24F 3/166 361/231 |
| 3,699,387 | A | * | 10/1972 | Edwards | H01T 14/00 310/308 |
| 3,915,672 | A | * | 10/1975 | Penney | B03C 3/38 327/183 |
| 4,038,052 | A | * | 7/1977 | Melcher | B03C 3/0175 137/827 |
| 4,178,156 | A | * | 12/1979 | Tashiro | B03C 3/74 95/59 |
| 4,231,766 | A | * | 11/1980 | Spurgin | B03C 3/36 361/230 |
| 4,253,852 | A | * | 3/1981 | Adams | B03C 3/09 361/230 |
| 4,259,707 | A | * | 3/1981 | Penney | B03C 3/10 361/212 |
| 4,892,139 | A | * | 1/1990 | LaHaye | F22B 37/48 110/216 |
| 4,967,119 | A | * | 10/1990 | Torok | H01T 19/00 261/DIG. 42 |
| 4,980,796 | A | * | 12/1990 | Huggins | B03C 3/12 361/231 |
| 5,470,462 | A | * | 11/1995 | Gauger | C02F 1/48 204/196.15 |
| 5,492,677 | A | * | 2/1996 | Yoshikawa | B01D 53/32 422/169 |
| 5,695,619 | A | * | 12/1997 | Williamson | B01D 53/32 204/165 |

(Continued)

*Primary Examiner* — Craig Schneider
*Assistant Examiner* — Minh Le
(74) *Attorney, Agent, or Firm* — MH2 Technology Law Group LLP

(57) ABSTRACT

An electrostatic bypass system and method as disclosed utilizes corona wires extending laterally across the flow path upstream of the section of the flow path of concern. The corona wires can be arranged to form a mesh across the flow path and can be powered by a power source to ionize the air surrounding the wires to thereby apply an electrostatic charge to the particulates as they pass through an ionized section of air proximate the wires.

17 Claims, 10 Drawing Sheets

(56) References Cited

U.S. PATENT DOCUMENTS

Figure 1:
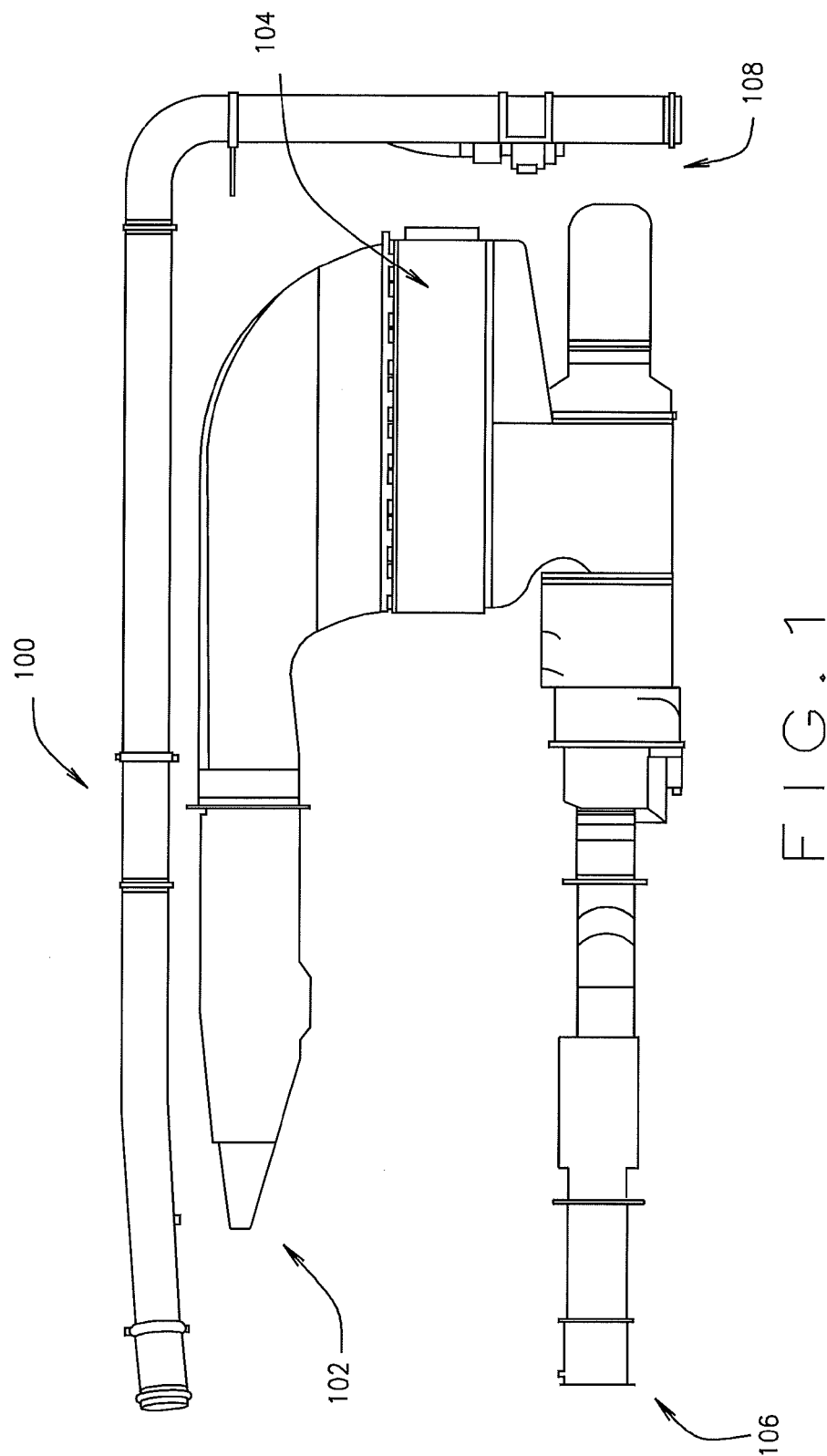

| | | | | |
|---|---|---|---|---|
| 5,964,433 | A * | 10/1999 | Nosenchuck | B64C 23/005 244/130 |
| 6,032,406 | A * | 3/2000 | Howse | A01M 1/023 43/107 |
| 6,186,176 | B1 * | 2/2001 | Gelbmann | G05D 7/03 137/251.1 |
| 6,508,273 | B1 * | 1/2003 | Van Den Berg | G01N 27/44752 137/807 |
| 6,761,752 | B2 * | 7/2004 | Fissan | B03C 3/12 95/74 |
| 6,793,012 | B2 * | 9/2004 | Fang | F28D 1/0443 165/140 |
| 7,202,990 | B2 * | 4/2007 | Preuss | G02F 1/167 359/290 |
| 7,738,813 | B2 * | 6/2010 | Yasutomi | G03G 15/0208 399/171 |
| 7,937,025 | B2 * | 5/2011 | Nohsho | G03G 15/0291 324/324 |
| 8,088,267 | B2 * | 1/2012 | James | B01D 57/02 137/825 |
| 8,318,084 | B2 * | 11/2012 | Johnson | A61L 9/015 422/120 |
| 8,628,607 | B2 * | 1/2014 | Rao | B03C 3/017 96/63 |
| 8,852,325 | B2 * | 10/2014 | Beer | G01N 33/0057 95/71 |
| 9,016,318 | B2 * | 4/2015 | Mankame | F15B 21/065 137/827 |
| 9,151,549 | B2 * | 10/2015 | Goodson | F15D 1/02 |
| 2015/0192508 | A1 * | 7/2015 | Janka | G01N 15/0656 250/282 |
| 2015/0343454 | A1 * | 12/2015 | Tyburk | B03C 3/155 95/70 |

* cited by examiner

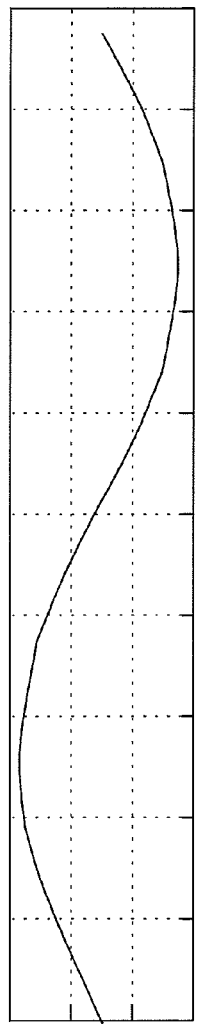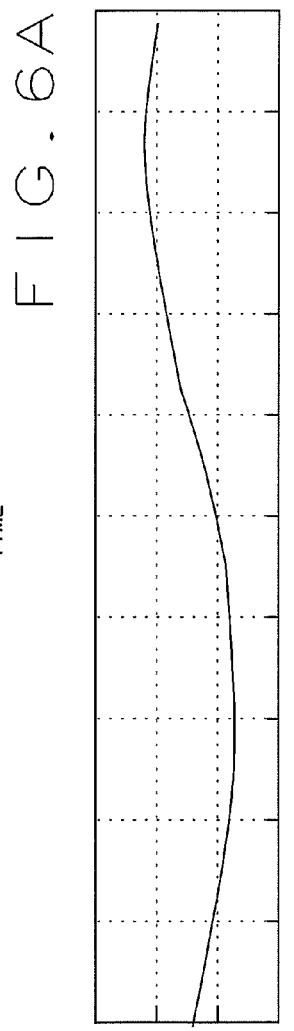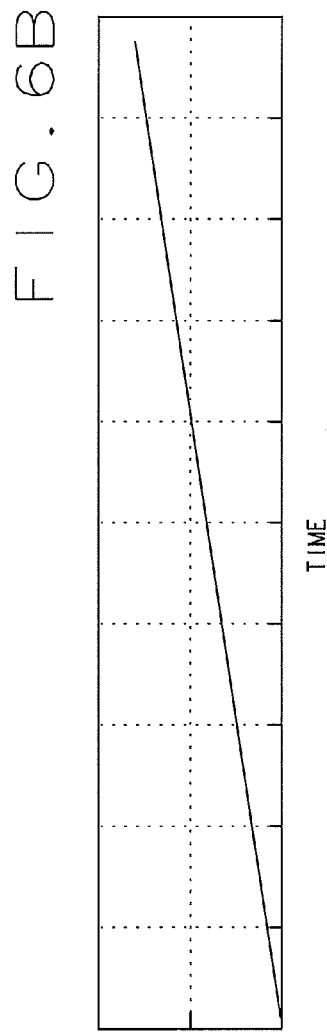

SYSTEM AND METHOD FOR AN ELECTROSTATIC BYPASS

BACKGROUND

Field

This technology as disclosed herein relates generally to fluid flow systems and, more particularly, to air flow systems and the undesirable collection and accumulation of particulates in areas of the air flow system.

Background

Traditional fluid flow systems, in particular air flow systems, may have sections of the flow path where particulates collect and accumulate thereby restricting fluid flow. This can be due to the fact that sections along the flow path can have partial obstructions, or structures that extend laterally across the flow path with respect to the direction of the flow and that collect particulates. One specific example can be a Cabin Air Conditioning and Temperature Control System (CACTCS) having a flow path along which air flows, where a section of the flow path includes a Heat Exchanger (HX). The HX can have an array of fins, which can be the core of the heat exchanger, that extend laterally across the flow path with respect to the direction of air flow.

Particulates traveling along the flow path can collect/attach themselves on the array of fins of the HX and accumulate over time thereby restricting air flow. The reduction in air flow and the increase in pressure will necessitate a service action requiring cleaning or replacing of at least the fin section of the HX. There are known examples where aircraft CACTCS having an HX require cleaning or replacement of the HX at regular intervals that are much shorter than intended resulting in excessive maintenance cost for servicing the HX. However, the collection of particulates at certain sections along the flow path is not necessarily due to particulates attaching themselves to obstructions extending laterally across the flow path. For example, particulates can even attach themselves to the side walls around the flow path. Further, the section of the flow path where particulates collect need not be a heat exchanger. It could be any type of fluid exchanger. The fluid exchanger could be an array of baffles or vents.

In order to address the problem of particulates accumulating, a traditional electrostatic precipitator using corona wires and a positively or negatively charged surface or other filtration system could be installed upstream with respect to the section of the air flow path of concern (in the example—the FIX with fins) The corona wires of the precipitator cause a corona discharge, which is an electrical discharge brought on by the ionization of a fluid (typically air) surrounding a conductor (the corona wire) that is electrically charged. A corona wire can be a positive corona wire causing a positive ionization of the surrounding fluid, or a negative corona wire causing a negative ionization of the surrounding fluid. The polarity of the voltage applied electrically coupled from a power source will determine whether the corona wire is a negative corona or a positive corona.

Spontaneous corona discharges occur naturally in high-voltage systems unless care is taken to limit the electric field strength. The corona discharge will occur when the strength (potential gradient) of the electric field around a conductor is high enough to form a conductive region, but not high enough to cause electrical breakdown or arcing to nearby objects. Corona discharge is a process by which a current flows from an electrode (the corona wire) with a high potential into a neutral fluid, usually air, by ionizing that fluid so as to create a region of plasma around the electrode. The ions generated eventually pass charge to nearby areas of lower potential, in this case particulates traveling through, or recombine to form neutral gas molecules.

However, as the electrostatic filtration system collects particulates over time, it would also have to be cleaned or replaced. Therefore, a filtration system of this nature would not be a resolution. Further, filtration systems including cyclonic or porous membrane filtration systems will likely cause an undesirable pressure drop and may also require cleaning at shorter intervals.

A system and method is needed to reduce the service required to sections of a flow path having a tendency to collect particulates.

SUMMARY

The technology as disclosed herein is an electrostatic bypass system and method as disclosed utilizes corona wires extending laterally across the flow path upstream of the section of the flow path of concern (in the example the HX is the section of concern—therefore upstream of the HX). The corona wires can be arranged to form a mesh across the flow path and can be powered by a power source to ionize the air surrounding the wires to thereby apply an electrostatic charge to the particulates as they pass through an ionized section of air proximate the wires.

The structures that extend laterally across the flow path downstream with respect to the corona wires and that have a tendency to collect particulates, can also have a charge applied with the same polarity as the charge applied to the particulates. The charge applied to the structure can be provided by a power source. With the same charge being applied to the particulates and the structure extending across the flow path, the particulates are more likely to pass through the section of the flow path that is of concern without collecting on the structure extending across the flow path. The charged particles will be repelled by the like charged structures in the section of the flow path of concern.

An implementation of a particulate bypass system can include an electrically charged corona wire mesh electrically coupled to a power source and extending across a particulate flow path having a particulate flow direction. The corona wire mesh can be one of a positive corona wire mesh or a negative corona wire mesh, where the power source applies a voltage to the corona wire mesh sufficient to ionize a fluid proximate the corona wire mesh to apply an electrostatic charge to one or more particles flowing through the corona wire mesh with one of an electrostatic positive charge or an electrostatic negative charge.

A fluid exchanger can be disposed in the particulate flow path downstream with respect to the corona wire mesh. The fluid exchanger can have a channel having an open ended channel wall extending substantially parallel with respect to the particulate flow direction. A wall charge can be applied to the channel wall that is one of a positive wall charge or a negative wall charge, and where a polarity of the wall charge and a polarity of the electrostatic charge are the same to repel particles away from the channel wall as the particles flow through the fluid exchanger.

Another implementation of the particulate bypass as disclosed can include a fluid exchanger that has an array of fins extending across the particulate flow path having a fin charge that is one of a positive fin charge or a negative fin charge applied to one or more of the fins of the array of fins. A polarity of the fin charge and the polarity of the electrostatic charge can be the same to repel the particles away from the array of fins as the particles flow through the fluid exchanger.

In a further implementation the fluid exchanger can be an air exchanger. For example, the air exchanger can be an air-to-air heat exchanger and the array of fins can form a core of the air-to-air heat exchanger and the array of fins can be configured to form one or more flow channels through the air-to-air heat exchanger. Yet another implementation can be configured such that the one or more fins of the array of fins form the walls of the one or more flow channels and where the one or more fins of the array of fins repel the particles away from the one or more fins inward into the one or more flow channels.

Another implementation of the technology can be a method including electrostatically charging with an electrostatic charge one or more particles flowing along a fluid path in a particulate flow direction upstream with respect to a fluid exchanger. The electrostatic charge can be one of an electrostatic positive charge or an electrostatic negative charge. The method can further include applying a wall charge to an open ended channel wall of the fluid exchanger that is extending substantially parallel with respect to the particulate flow direction.

The wall charge applied to the channel wall can be one of a positive wall charge or a negative wall charge. A polarity of the wall charge and a polarity of the electrostatic charge can be the same, thereby repelling particles away from the channel wall as the particles flow through the fluid exchanger.

Another implementation of the method can include extending a corona wire mesh across the particulate flow path and electrically charging the corona wire mesh with an electrically coupled power source, where the corona wire mesh is one of a positive corona wire mesh or a negative corona wire mesh. The method can further include applying a voltage to the corona wire mesh sufficient to ionize a fluid proximate the corona wire mesh, thereby applying an electrostatic charge to one or more particles flowing through the corona wire mesh with one of an electrostatic positive charge or an electrostatic negative charge.

Fluid flow (in the example—air flow) first passes through the corona wires, and the particulates suspended in the fluid flow will receive either a positive or a negative charge as the particulates are traveling through the corona wires. The efficiency of the bypass can be a function of the particulate's size, composition, mass and concentration within the flow. The efficiency can also be driven by the corona wires ability to effectively apply a charge to the particulates by ionizing the air.

The features, functions, and advantages that have been discussed can be achieved independently in various implementations or may be combined in yet other implementations further details of which can be seen with reference to the following description and drawings.

The electrostatic bypass technology as disclosed can reduce the amount of particulates that attach themselves to structures at a section of the flow path. The system can comprise a section of the flow path that collects particulates, a traditional heat exchanger (HX), an HX charging mechanism, and matrix of corona wires.

Airflow being sent through the heat exchanger can first pass through the matrix of corona wires and can gain a charge (either + or − charge). At the same time, the HX core is charged at the same polarity as the particulates. As these particulates pass through the heat exchanger they are repelled from the heat exchanger walls. These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIG. 1, is an illustration of CACTCS air conditioning pack;

FIG. 2, is an illustration of an array of fins of a heat exchanger;

FIG. 3, is an illustration of a flow channel and an open-ended channel wall;

FIG. 4, is a graphical illustration of modeling of a particle path;

FIG. 5, is a graphical illustration of the modeling of a particle path;

FIGS. 6A-6C, are graphical illustrations of the components of a particle path;

FIG. 7 is a graphical illustration of the modeling of a particle velocity versus the y-position;

FIG. 8, is an illustration of an air flow system;

FIGS. 9A-9C, is an illustration of an air flow system with a corona mesh; and FIG. 10 is a graphical illustration of the elementary charges applied to a particle of a certain diameter base on the parametric of the electric field.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIGS. 1-10 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified.

One implementation of the present technology as disclosed comprising electrically charged particles flowing through an electrically charged fluid exchange teaches a novel system and method for implementing an electrostatic bypass in a fluid flow system. The details of the technology as disclosed and various implementations can be better understood by referring to the figures of the drawing.

Referring to FIG. 1, an illustration of CACTCS air conditioning pack 100 is provided. The air conditioning pack 100 is provided for one illustration of an implementation of the electrostatic bypass technology disclosed herein in a fluid flow system. However, the electrostatic bypass technology could be implemented in various other fluid flow systems without departing from the scope of the technology as disclosed herein. The air conditioning pack 100 is an example of an air flow system having an air inlet 102 and fluid exchanger 104 that is downstream with respect to the air inlet 102. The fluid exchanger 104 is illustrated in FIG. 1 as a air-to-air heat exchanger. Air can flow downstream from the air inlet 102 to the fluid exchanger 104. Air can flow downstream from the fluid exchanger and out of the air outlet 106 or the air exhaust 108.

Figure 2:
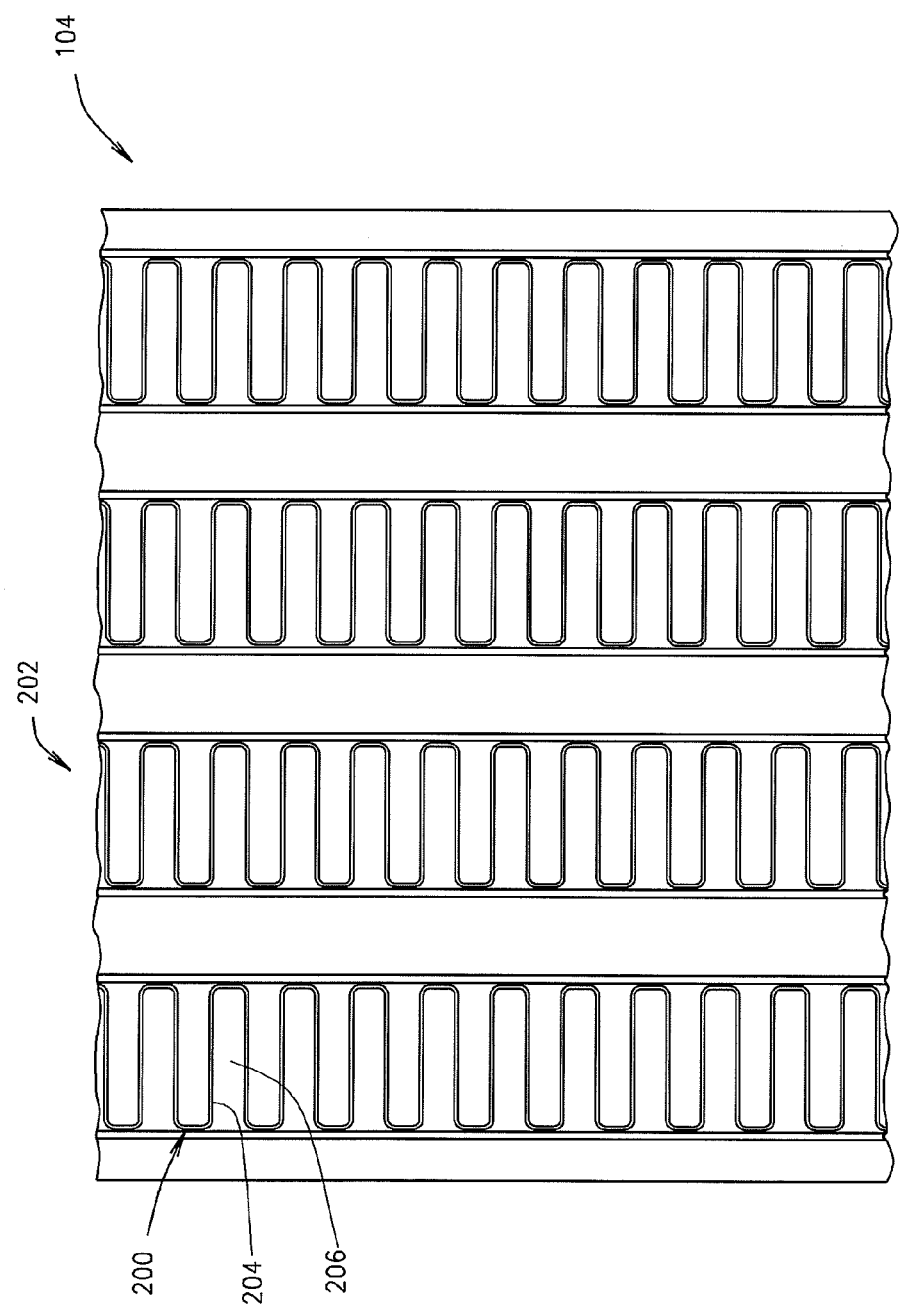

Referring to FIG. 2, an illustration of an array of fins of a heat exchanger is provided. As indicated, the fluid exchanger 104 as illustrated in FIG. 1, can be an air-to-air heat exchanger. The fluid exchanger 104, in this example, can have an array of fins 202, including one or more fins 200. The fins 200 can form a channel 206, which can also be referred to as a flow channel through which air flows. The fins 200 can form an open-ended channel wall 204 about the channel 206.

Figure 3:
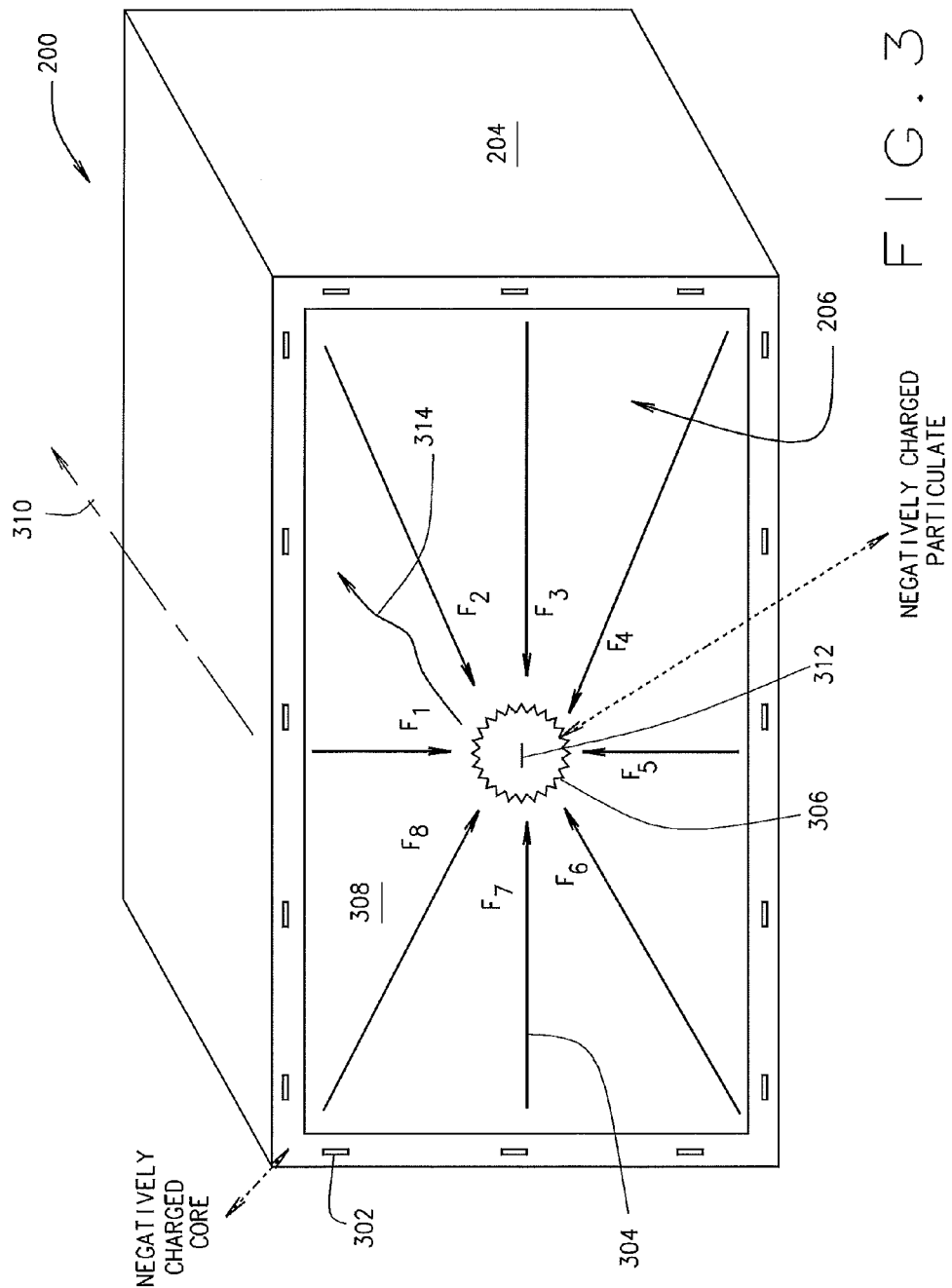

Referring to FIG. 3, an illustration of a fin 200 forming a channel 206, having an open-ended channel wall 204 formed by the fin 200. The open-ended channel wall 204 can have a negative wall charge 302. The channel 206 and the open-ended channel wall 204 extend substantially in parallel with respect to a particulate flow path 314 and a particulate flow direction 310. The negative wall charge 302 as illustrated will repel a negatively charged particle 312 with a repelling force 304, due to the wall charge and the particle charge having the same polarity. The charged particle 312 will travel along the particle flow path 314 along with the surrounding air 308 flowing along the particle flow path 314.

Figure 4:
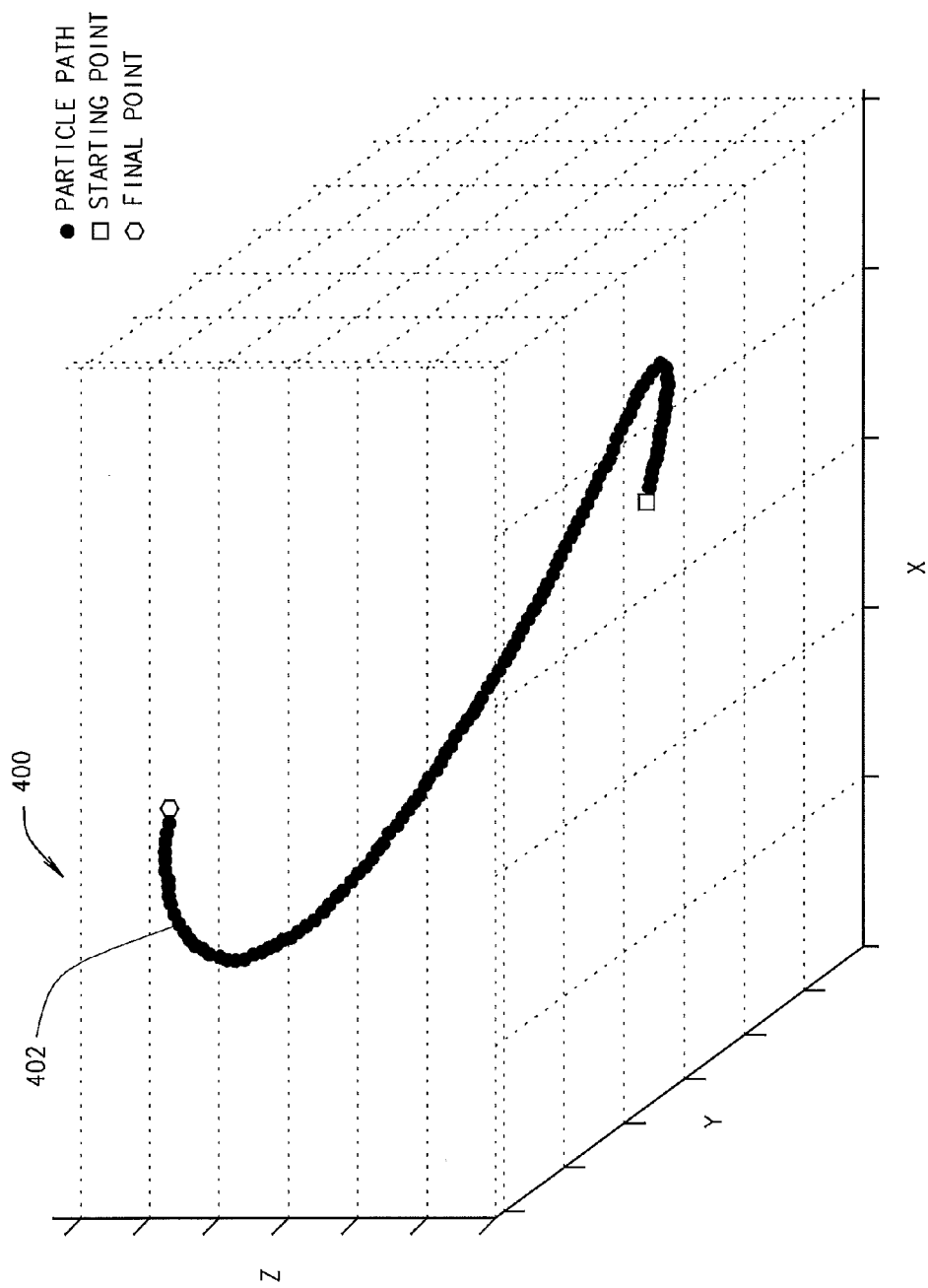
Figure 5:
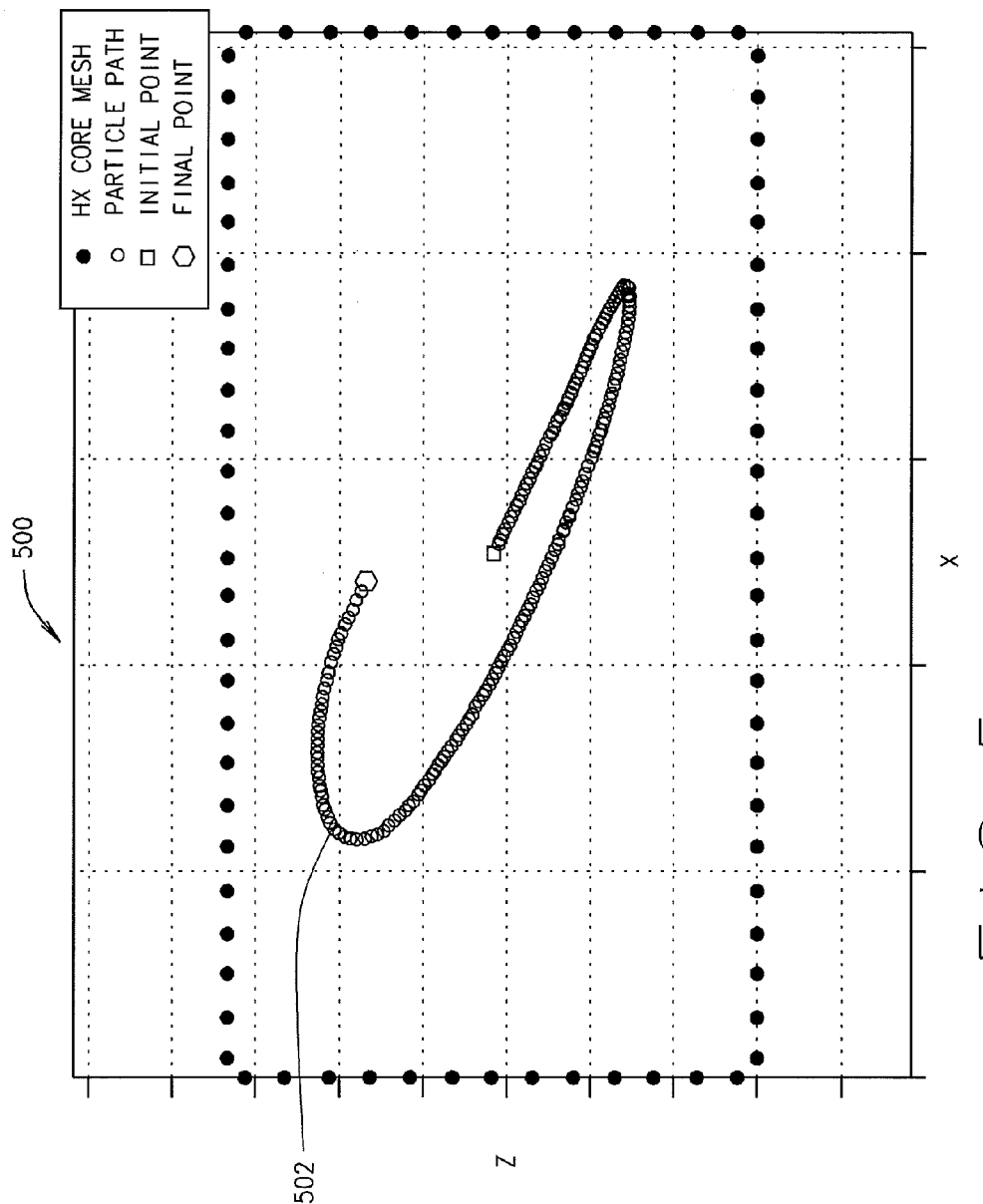
Figure 7:
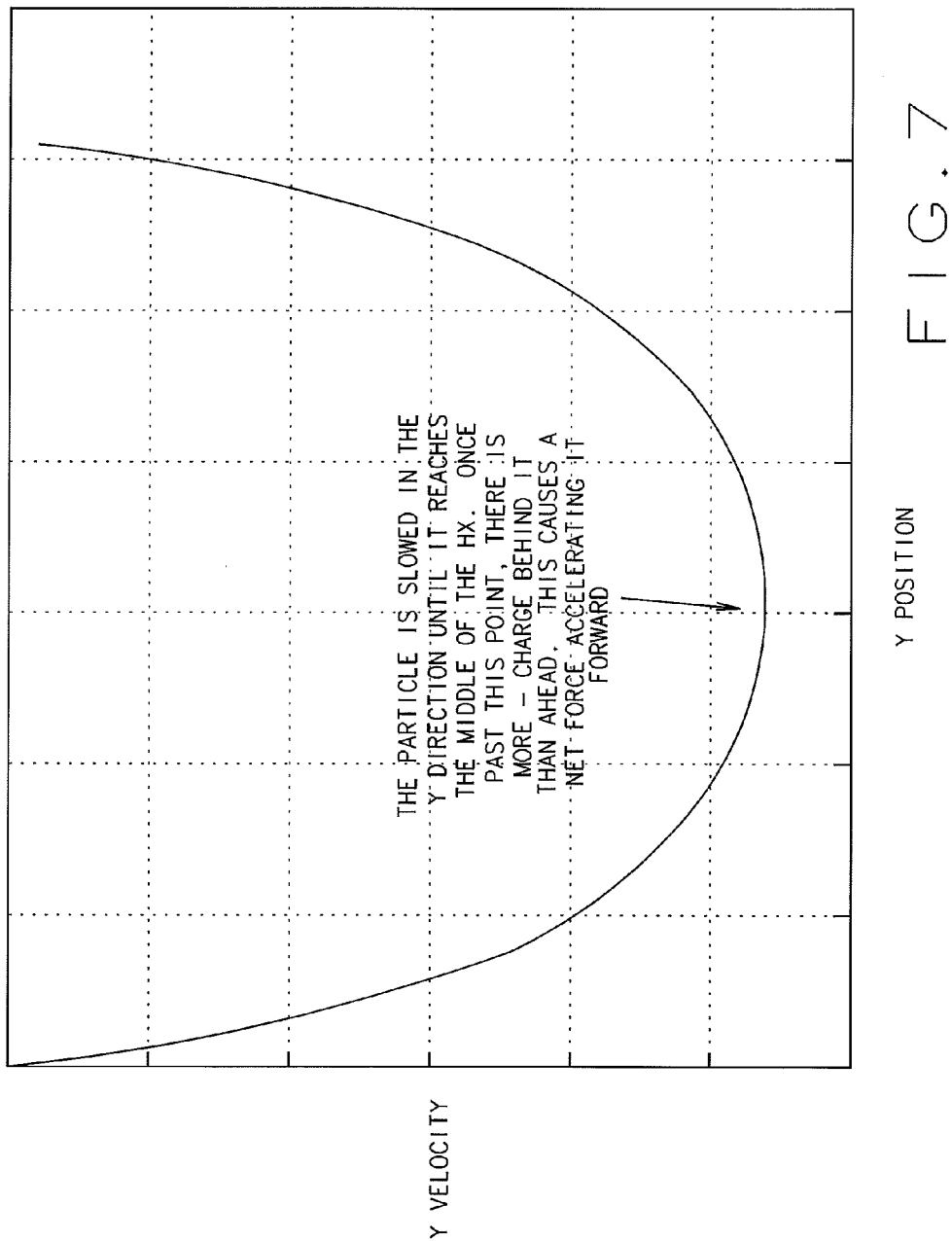
Figure 8:
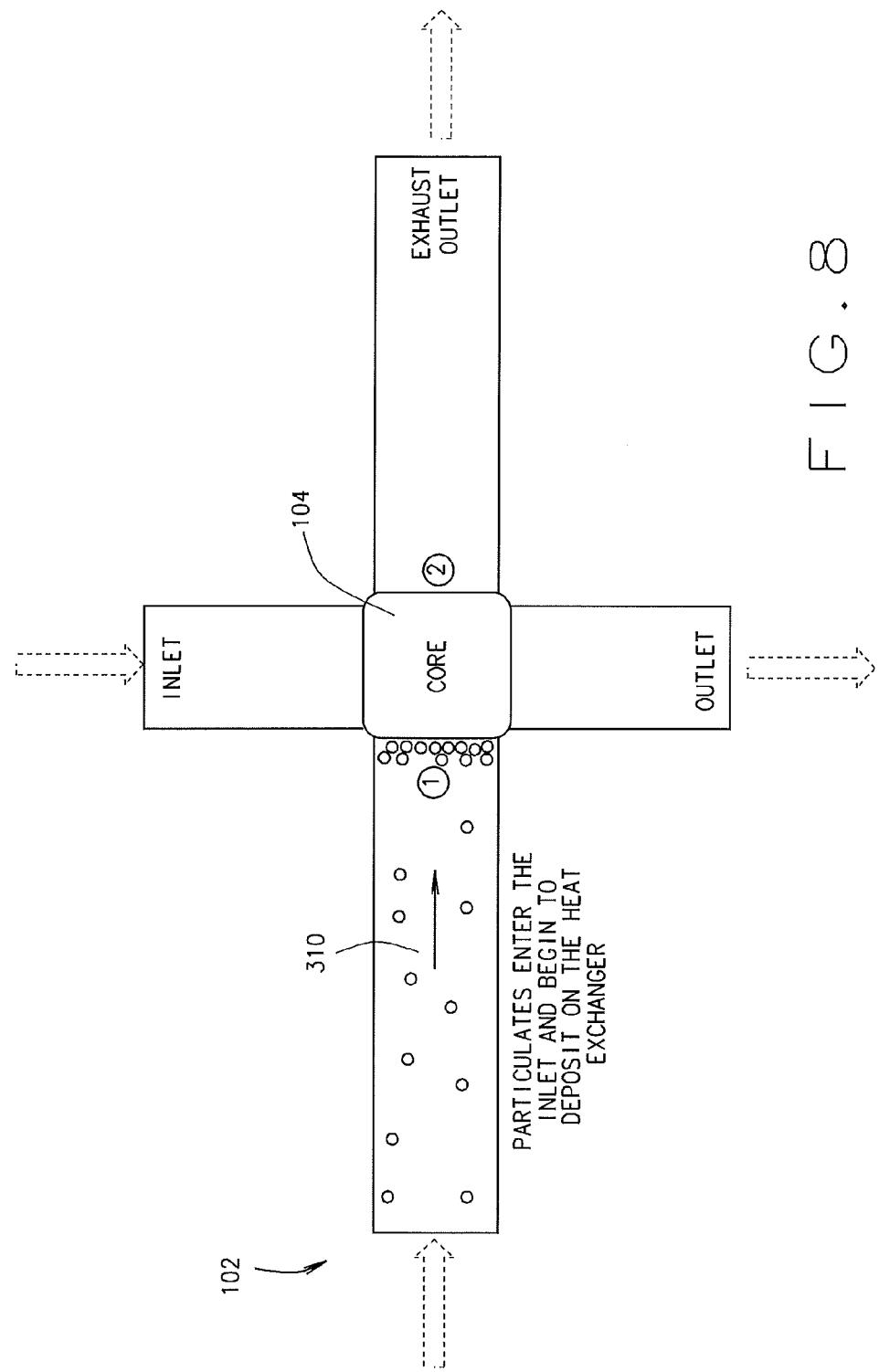
Figure 9:
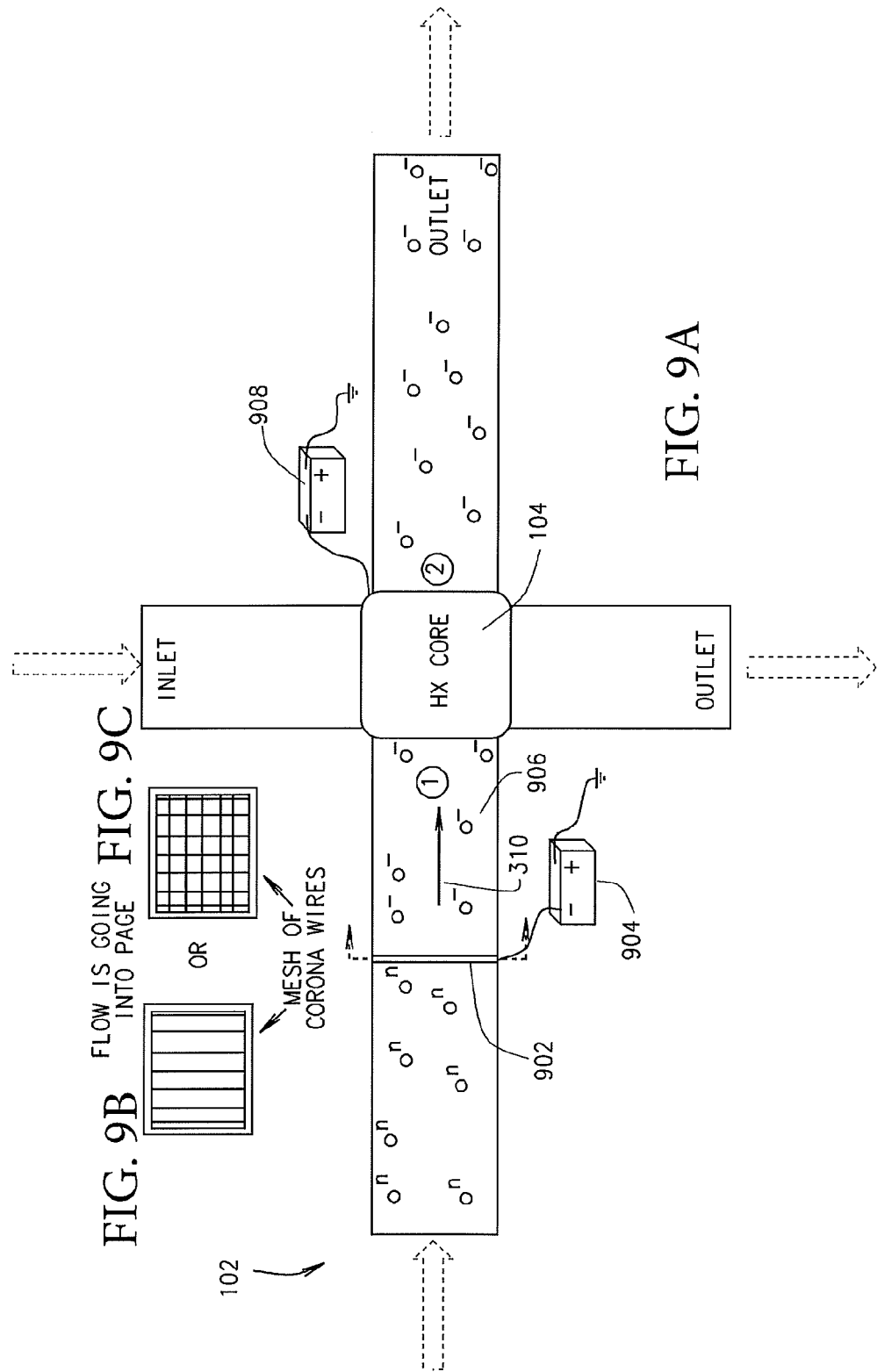
Figure 10:
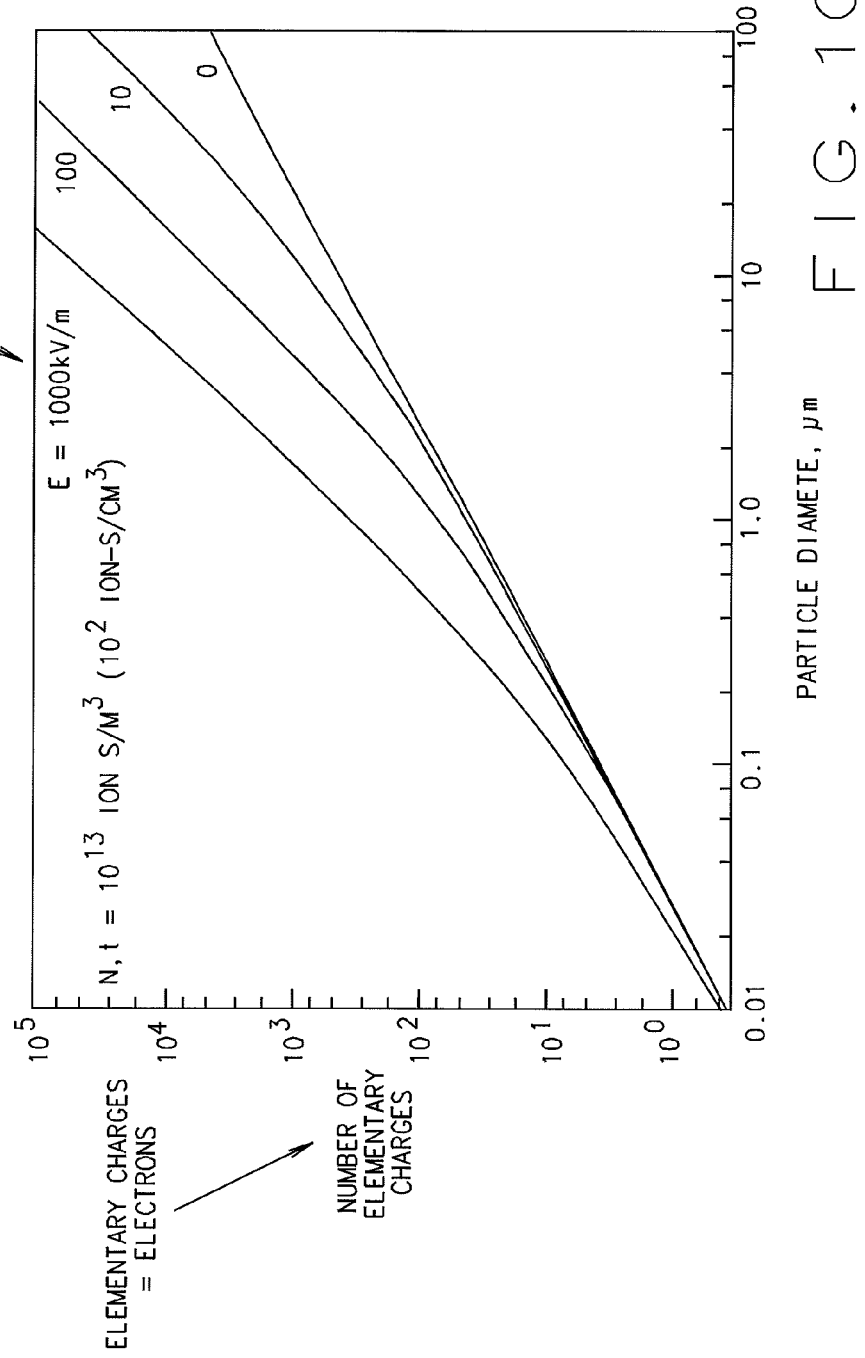

Referring to FIG. 4, a 3-dimensional graphical illustration 400 of a mathematical model of a modeled particle path 402 is shown when a charge has been applied to the particle and the particle is being repelled by the force created by the charged channel wall having the same polarity. Other graphical illustrations of the mathematical model are provided in FIGS. 5 through 7. Referring to FIG. 5, a 2-dimensional graphical illustration 500 of a mathematical model of a modeled particle path 502 is shown when a charge has been applied to the particle and the particle is being repelled by the force created by the charged channel wall having the same polarity. Referring to FIGS. 6A-6C, a separate component graphical illustration of a mathematical model of a modeled particle path is shown when a charge has been applied to the particle and the particle is being repelled by the force created by the charged channel wall having the same polarity. Referring to FIG. 7, a graphical illustration of the modeling of a particle velocity versus the y-position is shown. As shown, the particle can slow down in the Y-direction until it travels proximately to the middle of the channel Once past the middle area, the particle can accelerate.

Referring to FIG. 8, an illustration of a fluid flow system is shown including a fluid exchanger 104. The illustration is a simplified diagram of the airflow system illustrated in FIG. 1, where the fluid exchanger is downstream with respect to an air inlet 102. A particulate flow direction 310 is illustrated. The particles are shown traversing along a particle flow path and accumulating at the fluid exchanger, which would result in the fluid exchanger 104 having to be removed and cleaned or replaced. Referring to FIGS. 9A-9C, an illustration of a fluid flow system is shown with a corona wire mesh 902 extending across the particulate flow path upstream with respect to the fluid exchanger 104, between the fluid exchanger 104 and the air inlet 102.

The arrangement creates a particulate bypass system including an electrically charged corona wire mesh 902 electrically coupled to a power source (for example a battery 904), and extending across a particulate flow path having a particulate flow direction 310. The corona wire mesh can be one of a positive corona wire mesh or a negative corona wire mesh.

FIG. 9 illustrates a negative corona wire mesh. The power source (for example a battery 904) can apply a voltage to the corona wire mesh 902 sufficient to ionize a fluid proximate the corona wire mesh to apply an electrostatic charge to one or more particles 906 flowing through the corona wire mesh with one of an electrostatic positive charge or an electrostatic negative charge. An electrostatic negative charge is illustrated in FIG. 9.

A fluid exchanger can be disposed in the particulate flow path downstream with respect to the corona wire mesh 902. The fluid exchanger 104 can have a channel having an open ended channel wall extending substantially parallel with respect to the particulate flow direction 310. A wall charge can be applied to the channel wall that is one of a positive wall charge or a negative wall charge. A polarity of the wall charge and a polarity of the electrostatic charge can be the same, as illustrated, to repel particles away from the channel wall as the particles flow through the fluid exchanger 104.

The fluid exchanger has an array of fins, as illustrated in FIG. 2, extending across the particulate flow path, and can have a fin charge that is one of a positive fin charge or a negative fin charge applied to one or more of the fins of the array of fins. A polarity of the fin charge and the polarity of the electrostatic charge can be the same to repel the particles away from the array of fins as the particles flow through the fluid exchanger. As illustrated, the fluid exchanger can be an air exchanger, where the air exchanger can be an air-to-air heat exchanger and the array of fins can form a core of the air-to-air heat exchanger and said array of fins can be configured to form one or more flow channels through the air-to-air heat exchanger. The one or more fins of the array of fins, as illustrated in FIG. 2, can form the walls of the one or more flow channels and where the one or more fins of the array of fins repel the particles away from the one or more fins inward into the one or more flow channels.

A corona voltage can applied to the corona wire mesh 310 having a corona voltage amplitude sufficient to cause an electric corona discharge to thereby ionize the surrounding air in the particulate flow path sufficient to apply an electrostatic charge to the one or more particles, and sufficient to repel the one or more particles away from the one or more fins, where the corona voltage amplitude is based on an anticipated average particle mass. A fin voltage can be applied by a power source (for example—battery 908), to the one or more fins of the array of fins having a fin voltage amplitude sufficient to repel the one or more particles away from the one or more fins, where the fin voltage amplitude is based on the anticipated average particle mass. The fin voltage can be adjustable to increase or decrease the number of elementary charges in the one or more fins. The corona voltage can be adjustable to increase or decrease the ionization of the air surrounding the corona wire mesh.

Referring to FIG. 10, a graphical illustration of the elementary charges that can be applied to a particle of a certain diameter based on the parametric of the electric field is shown.

The various electrostatic bypass examples shown above illustrate a system and method for implementing an electrostatic bypass in a fluid flow system. A user of the present technology as disclosed may choose any of the above implementations, or an equivalent thereof, depending upon the desired application. In this regard, it is recognized that various forms of the subject electrostatic bypass system and method could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A particulate bypass system comprising:
   an electrically charged corona wire mesh electrically coupled to a power source and extending across a particulate flow path having a particulate flow direction, where the corona wire mesh is one of a positive corona wire mesh or a negative corona wire mesh, where the power source applies a voltage to the corona wire mesh sufficient to ionize a fluid proximate the corona wire mesh to apply an electrostatic charge to one or more particles flowing through the corona wire mesh with one of an electrostatic positive charge or an electrostatic negative charge; and
   a fluid exchanger disposed in the particulate flow path downstream with respect to the corona wire mesh, said fluid exchanger having:
   an array of fins extending across the particulate flow path having a fin charge that is one of a positive fin charge or a negative fin charge applied to one or more of the fins of the array, where a polarity of the fin charge and the polarity of the electrostatic charge are the same to repel the particles away from the array of fins as the particles flow through the fluid exchanger, the array of fins forming a core of the fluid exchanger and the fins are configured to form one or more flow channels through the fluid exchanger;
   wherein a corona voltage having a corona wire voltage amplitude is applied to the corona wire mesh and the corona voltage amplitude is sufficient to cause an electric corona discharge thereby ionizing air in the particulate flow path sufficient to apply an electrostatic charge to the one or more particles sufficient to repel the one or more particles away from the one or more fins, where the corona voltage amplitude is based on an anticipated average particle mass; and
   wherein a fin voltage is applied to the one or more fins of the array of fins having a fin voltage amplitude sufficient to repel the one or more particles away from the one or more fins, wherein the fin voltage amplitude is based on the anticipated average particle mass.

2. The particulate bypass system as recited in claim 1, where the fluid exchanger is an air exchanger.

3. The particulate bypass system as recited in claim 2, where the air exchanger is an air-to-air heat exchanger and the array of fins form a core of the air-to-air heat exchanger and said array of fins are configured to form one or more flow channels through the air-to-air heat exchanger.

4. The particulate bypass system as recited in claim 3, where the one or more fins of the array of fins form the walls of the one or more flow channels and where the one or more fins of the array of fins repel the particles away from the one or more fins inward into the one or more flow channels.

5. The particulate bypass system as recited in claim 1, where the fin voltage is adjustable to increase or decrease a number of elementary charges in the one or more fins.

6. The particulate bypass system as recited in claim 5, where the corona voltage is adjustable to increase or decrease the ionization of air surrounding the corona wire mesh.

7. The particulate bypass system as recited in claim 6, where the corona voltage and the fin voltage are applied with a battery.

8. A method for a particulate bypass system comprising:
   applying a corona voltage having a corona voltage amplitude to a corona wire mesh extending across a fluid path using a power source electrically coupled with the corona wire mesh, where the corona voltage amplitude is based on an average anticipated particle mass;
   electrostatically charging with one of an electrostatic positive charge or an electrostatic negative charge one or more particles flowing along a fluid path in a particulate flow direction upstream with respect to a fluid exchanger using the corona wire mesh, where:
      said electrostatic charge is one of an electrostatic positive charge or an electrostatic negative charge;
      the corona wire mesh is one of a positive corona wire mesh or a negative corona wire mesh; and
      the corona voltage applied to the corona wire mesh is sufficient to ionize a fluid proximate the wire mesh, thereby applying an electrostatic charge to the one or more particles flowing through the corona wire mesh;
   providing a fluid exchanger having an array of fins forming a core of the fluid exchanger and the fins are configured to form walls one or more flow channels across the particulate flow path;
   applying a wall charge to an open ended channel wall extending substantially parallel with respect to the particulate flow direction, where the wall charge applied to the channel wall is one of a positive wall charge or a negative wall charge, and where a polarity of the wall charge and a polarity of the electrostatic charge are the same, thereby repelling particles away from the channel wall as the particles flow in the channel wall;
   applying a fin charge that is one of a positive fin charge or a negative fin charge to one or more fins of the array of fins, where a polarity of the fin charge and the polarity of the electrostatic charge are the same; and
   repelling the particles having the one of the electrostatic positive charge and the electrostatic negative charge away from the walls of the one or more flow channels as the particles flow through the fluid exchanger, where:

the corona voltage is sufficient to cause an electric corona discharge thereby ionizing air within the particulate flow path sufficient to apply an electrostatic charge to the one or more particles.

9. The method of particle bypass as recited in claim 8, where the fluid exchanger is an air exchanger.

10. The method of particulate bypass as recited in claim 9, where the air exchanger is an air-to-air heat exchanger and the array of fins form a core of the air-to-air heat exchanger and said array of fins are configured to form one or more flow channels through the air-to-air heat exchanger.

11. The method of particulate bypass as recited in claim 8, further comprising:

applying a fin voltage having a fin voltage amplitude to the one or more fins of the array of fins, where the fin voltage amplitude is sufficient to repel the one or more particles away from the one or more fins, where the fin voltage amplitude is based on the anticipated average particle mass.

12. The method of particulate bypass as recited in claim 11, further comprising:
adjusting the fin voltage to increase or decrease the number of elementary charges in the one or more fins.

13. The method of particulate bypass as recited in claim 12, further comprising:
adjusting the corona voltage to increase or decrease the ionization of air surrounding the corona wire mesh.

14. A particulate bypass system comprising:
a corona wire mesh extending across a particulate flow path, the particulate flow path having a particulate flow direction, wherein the corona wire mesh is configured to have an electrostatic charge applied thereto, where the electrostatic charge comprises a first electrical polarity and a corona voltage having an amplitude;

an open ended channel wall providing at least part of a channel, the open ended channel wall extending parallel to the particulate flow direction; and an array of fins extending across the particulate flow path and providing at least one flow channel through a core of a fluid exchanger, wherein:

the amplitude of the corona voltage is sufficient to ionize a fluid proximate the corona wire mesh and to electrostatically charge a plurality of particles within the particulate flow path to form a plurality of electrostatically charged particles;

the amplitude of the corona voltage is based on an anticipated average mass of the plurality of particles;

one or more fins of the array of fins is configured to have an electrostatic charge applied thereto, where the electrostatic charge applied to the one or more fins comprises a second electrical polarity which is the same as the first electrical polarity and a fin voltage that is sufficient to repel the plurality of electrostatically charged particles; and the fin voltage is based on the anticipated average particle mass of the plurality of particles.

15. The particulate bypass system as recited in claim 14, where the fin voltage is adjustable to increase or decrease a number of elementary charges in the one or more fins.

16. The particulate bypass system as recited in claim 15, where the corona voltage is adjustable to increase or decrease the ionization of air surrounding the corona wire mesh.

17. The particulate bypass system as recited in claim 16, where the corona voltage and the fin voltage are applied with at least one battery.

* * * * *